(12) United States Patent
Shin et al.

(10) Patent No.: US 11,700,409 B2
(45) Date of Patent: *Jul. 11, 2023

(54) SERVER AND METHOD FOR CONTROLLING SERVER

(71) Applicant: SAMSUNG ELECTRONICS CO., LTD., Suwon-si (KR)

(72) Inventors: Yong-wook Shin, Osan-si (KR);
Seung-min Shin, Bucheon-si (KR);
Sung-wook Choi, Seoul (KR);
Hye-jeong Lee, Seoul (KR); Ji-hye Chung, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/199,113

(22) Filed: Mar. 11, 2021

(65) Prior Publication Data

US 2021/0204013 A1 Jul. 1, 2021

Related U.S. Application Data

(63) Continuation of application No. 15/174,142, filed on Jun. 6, 2016, now Pat. No. 10,986,391, which is a
(Continued)

(30) Foreign Application Priority Data

Jan. 7, 2013 (KR) ........................ 10-2013-0001839

(51) Int. Cl.
*H04N 21/278* (2011.01)
*H04N 21/232* (2011.01)
(Continued)

(52) U.S. Cl.
CPC ........... *H04N 21/278* (2013.01); *G06F 3/167* (2013.01); *G10L 15/22* (2013.01); *G10L 15/26* (2013.01);
(Continued)

(58) Field of Classification Search
CPC ....... G10L 15/22; G10L 15/26; G10L 19/265; G10L 2015/088; G10L 2015/223;
(Continued)

(56) References Cited

U.S. PATENT DOCUMENTS 8,161,071 B2 4/2012 LaJoie et al.
8,978,071 B2 3/2015 Kim et al.
(Continued)

FOREIGN PATENT DOCUMENTS

CN 102638711 A 8/2012
EP 1 772 854 A1 4/2007
(Continued)

OTHER PUBLICATIONS

Communication dated Nov. 11, 2021, issued by the Korean Intellectual Property Office in Korean Patent Application No. 10-2021-0074953.
(Continued)

*Primary Examiner* — Rong Le
(74) *Attorney, Agent, or Firm* — Sughrue Mion, PLLC

(57) ABSTRACT

A display apparatus and a server which implements an interactive system are disclosed. The server includes a communicator which receives text information corresponding to a user voice collected at the display apparatus from the display apparatus, and a controller which extracts an utterance component from the text information and controls so that a query to search contents is generated using the extracted utterance component and transmitted to an external server which categorizes metadata of the content under
(Continued)

each item and stores the same, in which the controller generates the query by adding a preset item to a criteria to search a content, when a number of criteria to categorize the content under an item corresponding to the extracted utterance component is less than a preset number.

20 Claims, 14 Drawing Sheets

Related U.S. Application Data continuation of application No. 14/149,083, filed on Jan. 7, 2014, now Pat. No. 9,380,330.

(51) Int. Cl.
    *H04N 21/4415*     (2011.01)
    *G10L 19/26*     (2013.01)
    *G10L 15/26*     (2006.01)
    *H04N 21/27*     (2011.01)
    *H04N 21/422*     (2011.01)
    *G06F 3/16*     (2006.01)
    *G10L 15/22*     (2006.01)
    *H04N 21/482*     (2011.01)
    *G10L 15/08*     (2006.01)

(52) U.S. Cl.
CPC ......... *G10L 19/265* (2013.01); *H04N 21/232* (2013.01); *H04N 21/27* (2013.01); *H04N 21/42203* (2013.01); *H04N 21/4415* (2013.01); *H04N 21/482* (2013.01); *H04N 21/4828* (2013.01); *G10L 2015/088* (2013.01); *G10L 2015/223* (2013.01)

(58) Field of Classification Search
CPC .... H04N 21/232; H04N 21/27; H04N 21/278; H04N 21/42203; H04N 21/4415; H04N 21/482; H04N 21/4828
See application file for complete search history.

(56) References Cited

U.S. PATENT DOCUMENTS

| | | |
|---|---|---|
| 9,390,714 B2 | 7/2016 | Kim |
| 2008/0103780 A1 | 5/2008 | DaCosta |
| 2010/0119208 A1 | 5/2010 | Davis et al. |
| 2010/0154015 A1 | 6/2010 | Kang et al. |
| 2011/0060592 A1 | 3/2011 | Kang et al. |
| 2011/0067059 A1 | 3/2011 | Johnston et al. |
| 2011/0067079 A1 | 3/2011 | White et al. |
| 2012/0117584 A1 | 5/2012 | Gordon |
| 2012/0127072 A1 | 5/2012 | Kim |
| 2012/0144426 A1 | 6/2012 | Han et al. |
| 2012/0210355 A1 | 8/2012 | Kim et al. |
| 2012/0210370 A1 | 8/2012 | Kim et al. |
| 2013/0268956 A1 | 10/2013 | Recco |
| 2014/0067395 A1 | 3/2014 | Balasubramanian et al. |
| 2014/0068649 A1 | 3/2014 | Badros et al. |
| 2014/0153705 A1 | 6/2014 | Moore et al. |

FOREIGN PATENT DOCUMENTS

| | | |
|---|---|---|
| EP | 2 461 258 A2 | 6/2012 |
| KR | 10-2010-0067174 A | 6/2010 |
| KR | 10-2011-0027362 A | 3/2011 |
| KR | 10-2012-0054743 A | 5/2012 |
| KR | 10-2012-0060692 A | 6/2012 |
| KR | 10-2012-0074451 A | 7/2012 |
| WO | 2011088053 A2 | 7/2011 |

OTHER PUBLICATIONS

Communication dated Nov. 16, 2017, from the State Intellectual Property Office of People's Republic of China in counterpart Application No. 201410006776.4.
Communication dated Sep. 20, 2018 issued by the Australian Patent Office in counterpart Australian Application No. 2014200029.
Communication dated Nov. 14, 2018 issued by the Korean Patent Office in Counterpart Korean Application No. 10-2013-0001839.
Communication dated Nov. 11, 2019, issued by the Korean Intellectual Property Office in corresponding Korean Application No. 10-2019-0121771.
Communication dated May 15, 2014 issued by the European Patent Office in counterpart European Application No. 14150056.1.
Communication dated Aug. 23, 2017 by the European Patent Office in counterpart European Patent Application No. 17179851.5.
Communication dated Feb. 3, 2020, from the European Patent Office in counterpart European Application No. 17179851.5.
Communication dated May 21, 2019 issued by the Korean Intellectual Property Office in counterpart Korean Application No. 10-2013-0001839.
Communication dated Jul. 3, 2019 issued by the Korean Intellectual Property Office in counterpart Korean Application No. 10-2013-0001839.
Communication dated Feb. 5, 2020, issued by the Korean Intellectual Property Office in corresponding Korean Application No. 10-2019-0121771.
Communication dated Sep. 10, 2020, issued by the European Patent Office in counterpart European Application No. 17179851.5.
Communication dated Jul. 3, 2021 issued by the Korean Intellectual Property Office in counterpart Korean Application No. 10-2021-0074953.
Communication dated Aug. 16, 2021 issued by the European Intellectual Property Office in counterpart European Application No. 17 179 851.5.
Communication dated May 10, 2022 by the Korean Intellectual Property Office in counterpart Korean English Patent Application No. 10-2022-0035383.
Communication dated Jan. 23, 2023, issued by the European Patent Office in counterpart European Application No. 17179851.5.
Communication dated Apr. 18, 2023, issued by the Korean Intellectual Property Office in Korean Patent Application No. 10-2022-0131627.

FIG. 5

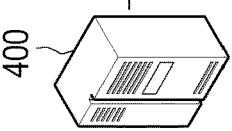

| 510 | 520 | 530 | 540 | 550 | 560 | 570 | 580 | 590 |
|---|---|---|---|---|---|---|---|---|
| TITLE | CAST | PRODUCER | GENRE | BROADCASTING TYPE | BROADCASTING TIME | SCREEN QUALITY | VIEW RATE | BROADCASTING CHANNEL |
| TITLE_AAA | CASTS_AAA | DIRECTOR_AAA | COMEDY | FIRST AIRING | JAN 8TH 18:00 | HD | EVERY AGE | CH2 |
| TITLE_BBB | CASTS_BBB | DIRECTOR_BBB | DRAMA | RE-AIRING | JAN 7TH 23:00 | HD | 15 AGE OVER | CH7 |
| TITLE_CCC | CASTS_CCC | DIRECTOR_CCC | DRAMA | RE-AIRING | JAN 8TH 9:00 | HD | 13 AGE OVER | CH12 |
| TITLE_DDD | CASTS_DDD | DIRECTOR_DDD | MOVIE | FIRST AIRING | JAN 7TH 22:30 | SD | 18 AGE OVER | CH37 |
| TITLE_EEE | CASTS_EEE | DIRECTOR_EEE | COMEDY | FIRST AIRING | JAN 8TH 8:00 | SD | 13 AGE OVER | CH44 |
| TITLE_FFF | CASTS_FFF | DIRECTOR_FFF | FANTASY | RE-AIRING | JAN 8TH 23:00 | HD | EVERY AGE | CH6 |
| TITLE_GGG | CASTS_GGG | DIRECTOR_GGG | MOVIE | FIRST AIRING | JAN 8TH 19:00 | SD | 15 AGE OVER | CH8 |
| TITLE_HHH | CASTS_HHH | DIRECTOR_HHH | MOVIE | RE-AIRING | JAN 8TH 15:00 | HD | EVERY AGE | CH99 |
| TITLE_III | CASTS_III | DIRECTOR_III | FANTASY | RE-AIRING | JAN 8TH 14:00 | SD | 18 AGE OVER | CH22 |

400

300

FIG. 8A
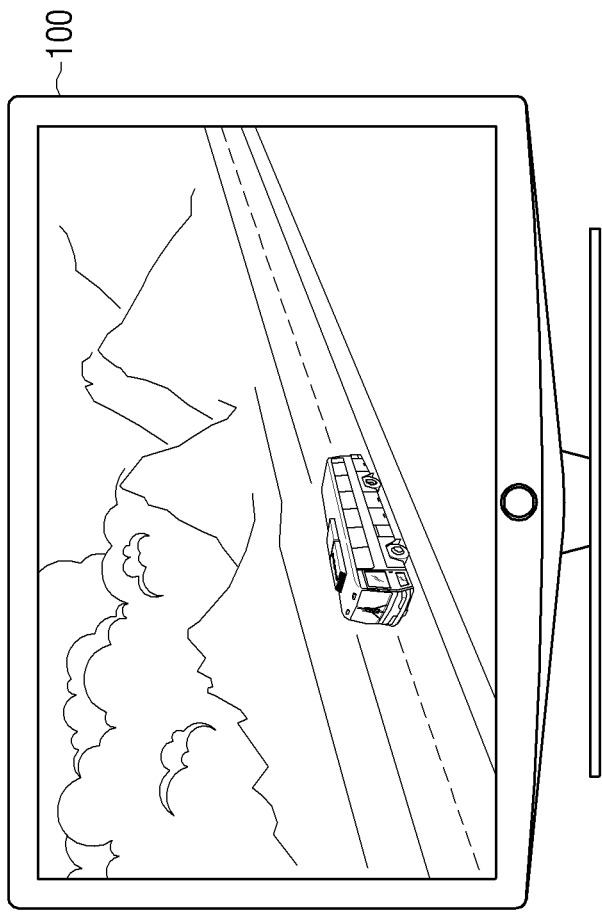

FIG. 8B
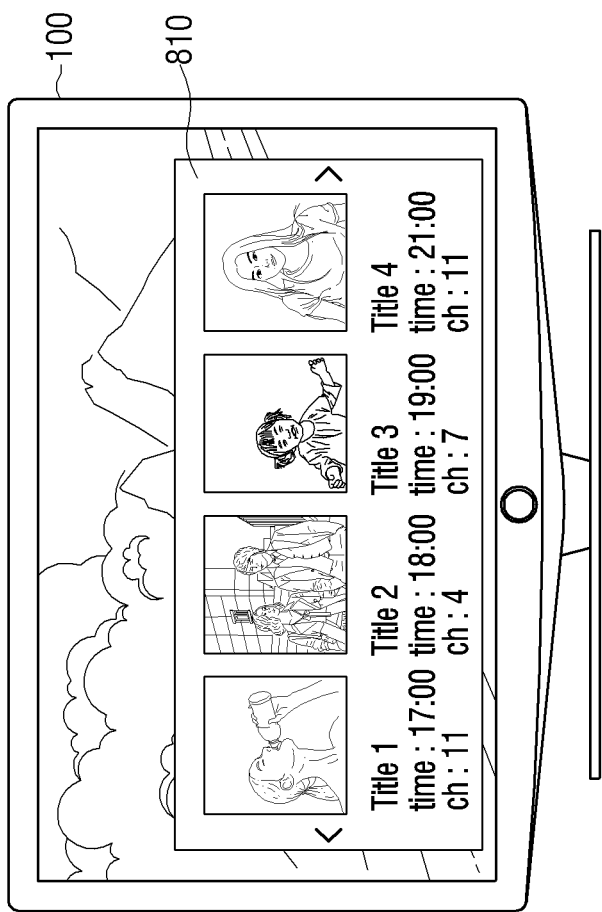
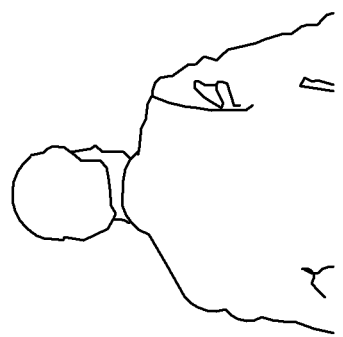

FIG. 9A
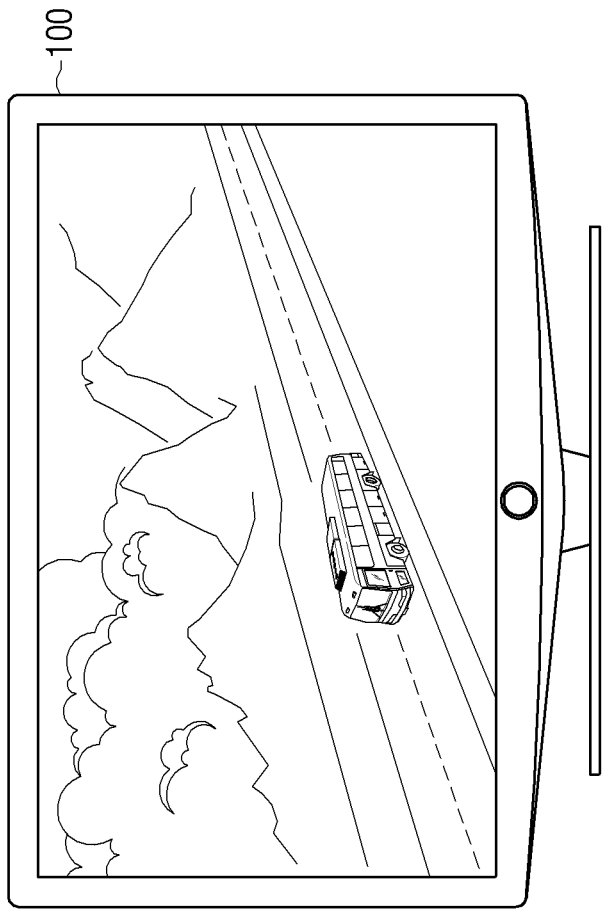

FIG. 9B
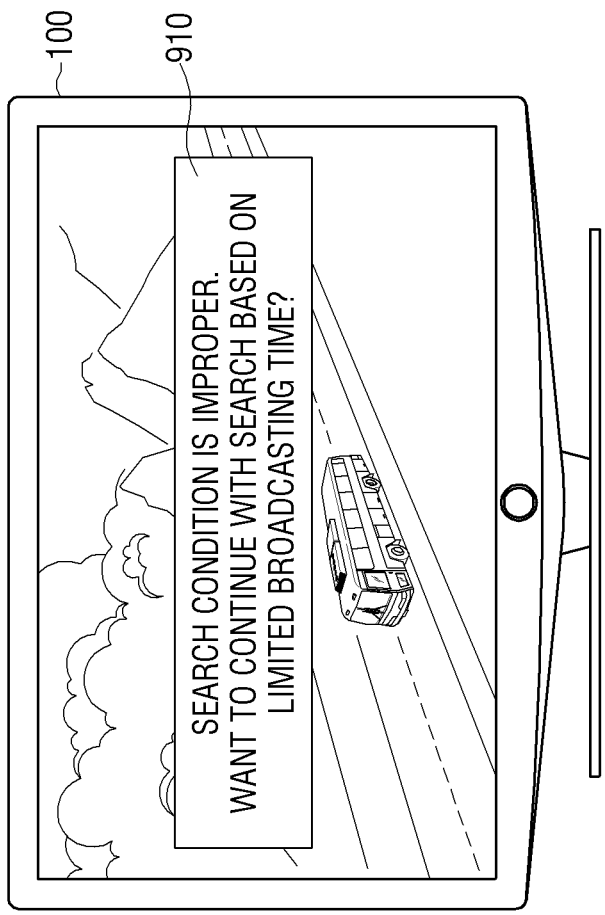
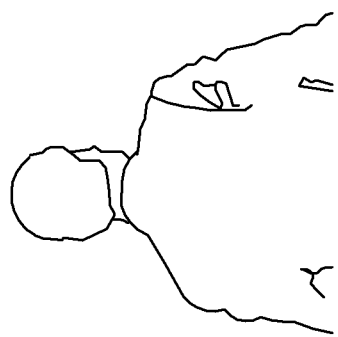

FIG. 9C
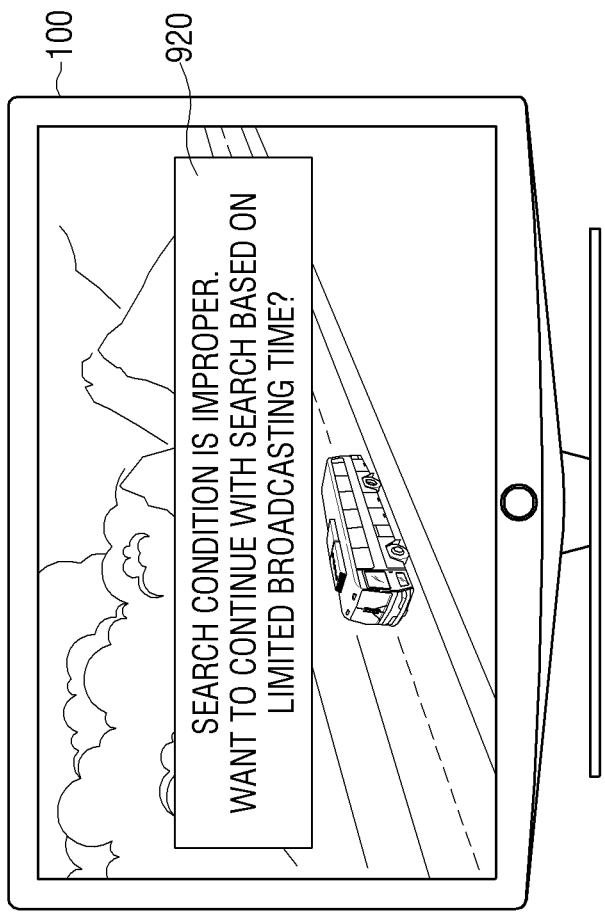
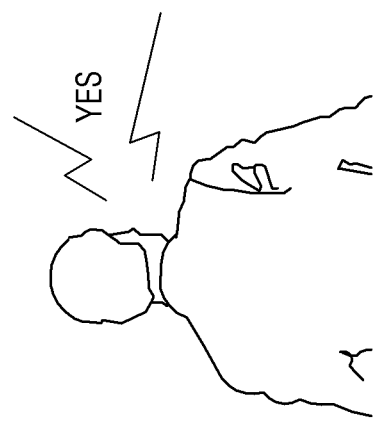

FIG. 9D
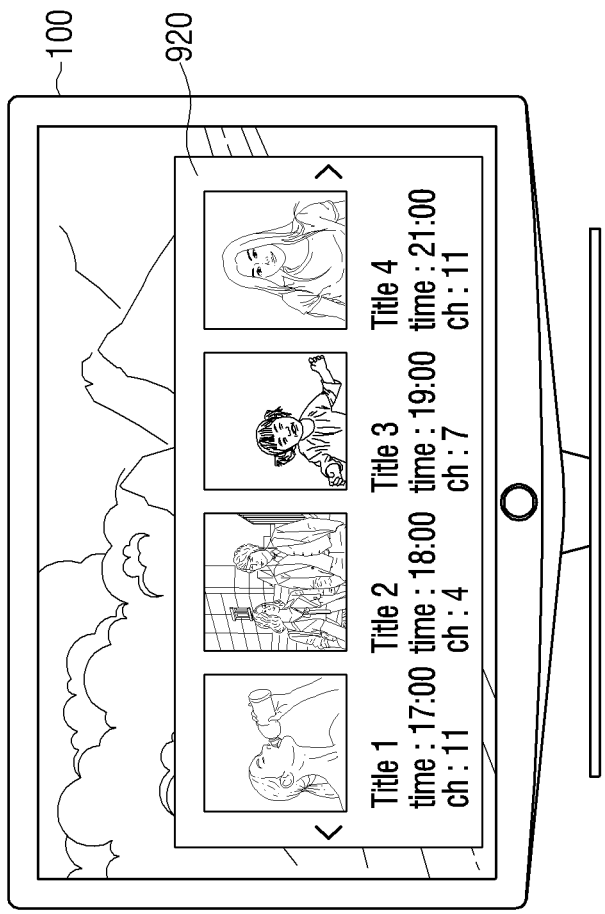
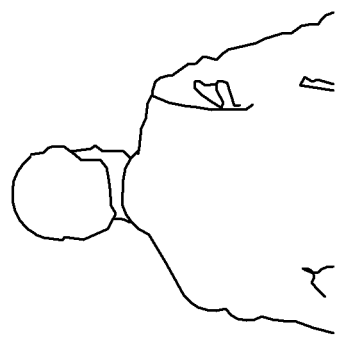

SERVER AND METHOD FOR CONTROLLING SERVER

CROSS-REFERENCE TO RELATED APPLICATIONS

This application is a continuation of U.S. patent application Ser. No. 15/174,142, filed on Jun. 6, 2016, now U.S. Pat. No. 10,986,391, which is a continuation of U.S. patent application Ser. No. 14/149,083, filed on Jan. 7, 2014, now U.S. Pat. No. 9,380,330, issued Jun. 28, 2016, and claims priority from Korean Patent Application No. 10-2013-0001839, filed on Jan. 7, 2013, in the Korean Intellectual Property Office, the disclosures of which are incorporated herein by reference in its entireties.

BACKGROUND

1. Field

Methods and apparatuses consistent with exemplary embodiments a server which constructs an interactive system and a method for controlling the server.

2. Description of the Related Art

With the development of electronic technologies, various types of display apparatuses have been developed and disseminated, and equipped with various functions according to users' demands. Specifically, modern televisions (TVs) provide Internet services by connecting the TV to the Internet, and a user can watch multiple digital broadcasting channels thorough the TV.

Technology to control display apparatuses according to the voices of users has recently been developed in order to control display apparatuses more conveniently and intuitively. Specifically, the TV may perform functions based on commands such as volume control or channel change issued by the voices of users, by recognizing the user voices.

However, in the related art, there are limitations where the contents cannot be searched for and provided according to user voices.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

One or more exemplary embodiments provide a server which searches contents when an interactive system is implemented on the server, and a controlling method thereof.

According to an aspect of the exemplary embodiment, a server which implements an interactive system with a display apparatus is provided, the server including a communicator which is configured to receive text information corresponding to a user's voice collected at the display apparatus from the display apparatus, and a controller configured to extract an utterance component from the text information and control so that a query to search contents is generated using the extracted utterance component, and transmitted to an external server which is configured to categorize metadata of the content under each item and store the metadata. The controller may generate the query by adding a preset item to a criteria to search a content, when a number of criteria categorizing the content under an item corresponding to the extracted utterance component is less than a preset number.

The server may additionally include a storage configures to store information regarding the criteria to categorize the contents under each item. The controller may determine whether the number of criteria to categorize the contents under an item corresponding to the extracted utterance component is less than the preset number based on the information regarding the criteria to categorize contents.

The controller may determine the preset item to be added to the criteria to search contents based on user preference information.

When the contents search cannot be performed in response to the query generated according to the addition of the preset item to the criteria to search the contents, the controller may regenerate a query to search contents based on the extracted utterance components.

When an item has less than the preset number of the criteria to categorize contents, the item may be at least one of a broadcasting type item and a screen quality item.

The preset item may be at least one of broadcasting time item and broadcasting channel item.

According to an aspect of another exemplary embodiment, there is provided a method for controlling a server which implements an interactive system with a display apparatus is provided. The method may include receiving text information corresponding to a user voice collected at the display apparatus, extracting an utterance component from the text information and generating a query to search a content by using the extracted utterance component, and transmitting the generated query to an external server which categorizes the content under each item and stores the same. The generating may include generating the query by adding a preset item to the criteria to search a content, when a number of criteria to categorize contents under an item corresponding to the extracted utterance component is less than a preset number.

The generating may include determining whether the number of criteria to categorize the contents under an item corresponding to the extracted utterance component is less than the preset number based on the information regarding the criteria to categorize contents.

The generating may include determining the preset item to be added to the criteria to search contents based on user preference information.

When contents search cannot be performed in response to the query generated according to the addition of the preset item to the criteria to search contents, the generating may include regenerating a query to search contents by using the extracted utterance components.

When an item has less than the preset number of the criteria to categorize contents, the item may be at least one of a broadcasting type item and a screen quality item.

The preset item may be at least one of broadcasting time item and broadcasting channel item.

According to various exemplary embodiments, a problem of too many search outcomes and subsequently deteriorated efficiency in searching contents are resolved when the contents are searched only based on the utterance components extracted from the user voices. Further, a user of the interactive system can be provided with contents search results that suit his intention when making the utterance, while he can also reduce the frequency of having to interact with the display apparatus. Accordingly, user convenience is improved.

BRIEF DESCRIPTION OF THE DRAWINGS

The above and/or other aspects will be more apparent by describing certain exemplary embodiments with reference to the accompanying drawings, in which:

FIG. 5 is a diagram illustrating an example of structured metadata according to an exemplary embodiment;

FIGS. 8A-8B, and 9A-9D illustrate examples of UI screens provided from a display apparatus according to an exemplary embodiment.

DETAILED DESCRIPTION OF EXEMPLARY EMBODIMENTS

Figure 1:
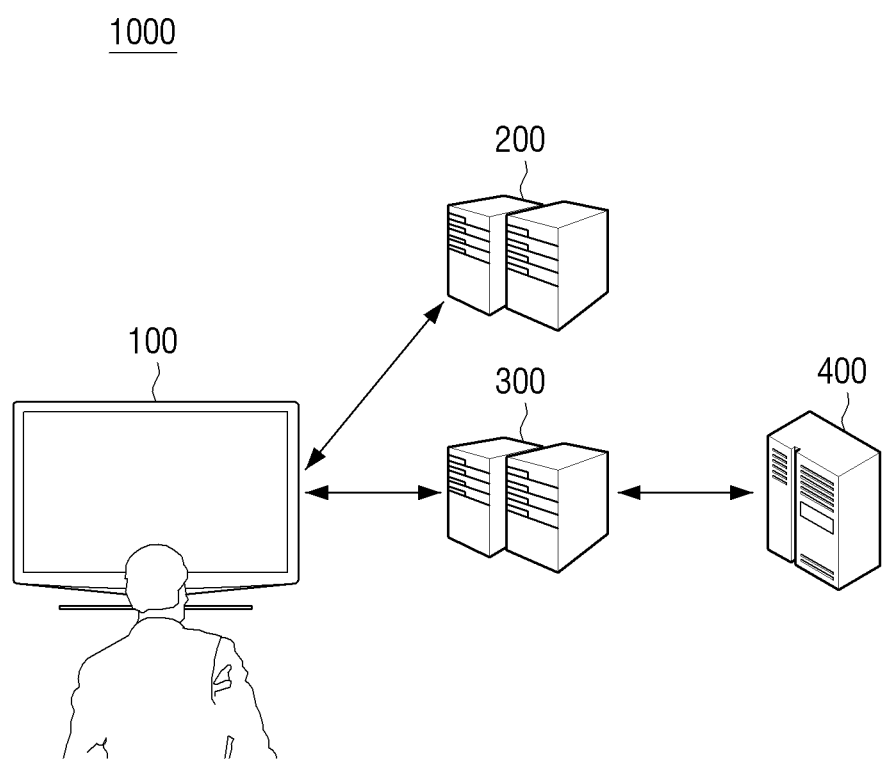
FIG. 1 is a diagram of an interactive system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiment. Accordingly, it is apparent that the exemplary embodiments can be carried out without those specifically defined matters. Also, well-known functions or constructions are not described in detail since they would obscure the exemplary embodiment with unnecessary detail.

FIG. 1 is a diagram which illustrates an interactive system according to an exemplary embodiment. Referring to FIG. 1, an interactive system 1000 includes a display apparatus 100, a first server 200, a second server 300, and an external server 400. As used herein, the 'second server 300' may be referred to as an 'interactive interface device'.

The display apparatus 100 may be controlled by a remote controller (not illustrated). Specifically, the display apparatus 100 may perform operations corresponding to remote control signals received from the remote controller (not illustrated). For example, when the display apparatus 100 is implemented as a TV such as the one illustrated in FIG. 1, the display apparatus 100 may perform functions such as power on/off, channel change, and volume control according to remote control signals received from the remote controller (not illustrated).

Further, the display apparatus 100 may perform various operations corresponding to user voices.

Specifically, the display apparatus 100 may perform functions corresponding to user voices, or may output system replies corresponding to user voices.

The display apparatus 100 may transmit collected user voices to the first server 200. When the user voices are received from the display apparatus 100, the first server 200 converts the received user voices to text information (i.e., texts) and transmits the text information to the display apparatus 100.

The display apparatus 100 transmits the text information received from the first server 200 to the second server 300. When the text information is received from the display apparatus 100, the second server 300 generates reply data corresponding to the received text information and transmits the reply data to the display apparatus 100.

The display apparatus 100 may perform various operations based on the reply data received from the second server 300. Herein, the reply data may include diverse information related to commands to control the display apparatus 100 to perform specific functions, and system replies outputted from the display apparatus 100.

Specifically, the display apparatus 100 may perform functions corresponding to user voices. In other words, the display apparatus 100 may perform functions corresponding to user voices among functions that can be provided from the display apparatus 100. For example, when user voices indicating a command to change channels are inputted from the display apparatus 100, the second server 300 may transmit a controlling command to change channels to the display apparatus 100. Therefore, the display apparatus 100 may change channels based on the received controlling command.

Further, the display apparatus 100 may output system replies corresponding to user voices. The system replies may be outputted in at least one format of a voice format and a UI screen format.

For example, when user voices requesting broadcasting program searches are inputted from the display apparatus 100, the second server 300 may search for contents matching the intention of the user utterance and transmit the search results to the display apparatus 100. Therefore, the display apparatus 100 may display a UI screen which includes a list of contents searched for in accordance with the intention of the user utterance.

Thus, the display apparatus 100 may perform various functions corresponding to user voices based on the received reply data from the second server 300.

When the intention of the user utterance is related to searching contents, the second server 300 may search contents matching the intention of the user utterance through the external server 400, and transmit the search results to the display apparatus 100.

Herein, the external server 400 may structure metadata and store the structured metadata. For example, the external server 400 may be implemented as a metadata server which structures metadata information regarding an Electronic Program Guide (EPG), music, video on demand (VOD), photographs, and applications, and stores structured metadata.

Specifically, the external server 400 may divide metadata of contents per item (or field), structure the metadata of the contents based on criteria to categorize the contents under each item, and store the structured metadata. As used herein, the 'item' may be the attribute which categorizes the metadata of contents, and the 'criteria to categorize the contents' may be detailed attributes which divide contents within each field. For example, when the item is 'broadcasting type', the criteria to categorize the contents may be attributes which further divide broadcasting type into first airing broadcasting and re-airing broadcasting. For another example, when the item is a 'screen quality', the criteria to categorize the contents may be attributes which further divide the screen quality into high definition (HD) and standard definition (SD).

Specifically, the second server 300 may extract utterance components from text information and generate queries to search contents by using the extracted utterance components. Herein, the second server 300 may generate a query by adding preset items as criteria to search the contents and transmit the query to the external server 400, when the criteria to categorize the contents under an item corresponding to the extracted utterance components are less than a preset number of criteria.

For example, it is assumed that a user utters, "Find re-airing programs." In this case, the second server 300 extracts "re-airing" as an utterance component related to a broadcasting type from the received text information, and determines the criteria to categorize the contents regarding broadcasting type from the stored structured metadata. Because broadcasting type is divided into two criteria such as re-airing and first-airing to categorize the contents, the second server 300 may generate a query to search the contents by adding a broadcasting channel which a user is currently viewing as the criteria to search contents.

As a result, according to the query received from the second server 300, the external server 400 may search broadcasting programs provided from a broadcasting channel which a user is currently viewing, and transmit information regarding the searched broadcasting programs (e.g., at least one of title, cast, producer, genre, broadcasting type, broadcasting time, screen quality, viewing rate, broadcasting channel, and thumbnail) to the second server 300. When search results corresponding to user voices are received from the external server 400, the second server 300 may transmit reply data so that the display apparatus 100 can output system replies corresponding to user voices to the display apparatus 100. Accordingly, the display apparatus 100 may output a list of broadcasting programs provided from a broadcasting channel which a user is currently viewing as re-airing programs in response to system replies to a user voice utterance such as, "Find re-airing programs."

Thus, the server according to an exemplary embodiment may generate a query by adding preset items as the criteria to search contents, when the criteria to categorize contents under an item corresponding to utterance components extracted from text information are less than the preset number. The above process may solve the following problem. When contents are searched only by utterance components extracted from user voices, efficiency of contents searching may be deteriorated because too many contents are being searched.

Although FIG. 1 illustrates the display apparatus 100 as implemented as a TV, this is merely exemplary. The display apparatus 100 may be implemented as various electronic devices such as a mobile phone such as a smart phone, a desktop personal computer (PC), a laptop computer, or a Global Positioning System (GPS).

Further, although FIG. 1 illustrates the first server 200 and the second server 300 implemented as separate servers, this is merely exemplary. The first server 200 and the second server 300 may also be implemented as a single interactive server including both the first server 200 and the second server 300. In this case, the display apparatus 100 may transmit user voices to the interactive server, and the interactive server may convert user voices received from the display apparatus 100 to text information, and search contents matching intention of the utterance by using the converted text information. When the criteria to categorize the contents under an item corresponding to the extracted intention of the utterance from text information are less than the preset number, the interactive server may generate a query by adding preset items as the criteria to search the contents. Therefore, when the first server 200 and the second server 300 are implemented as one interactive server including both servers, the display apparatus 100 may transmit user voices to the interactive server.

Figure 2:
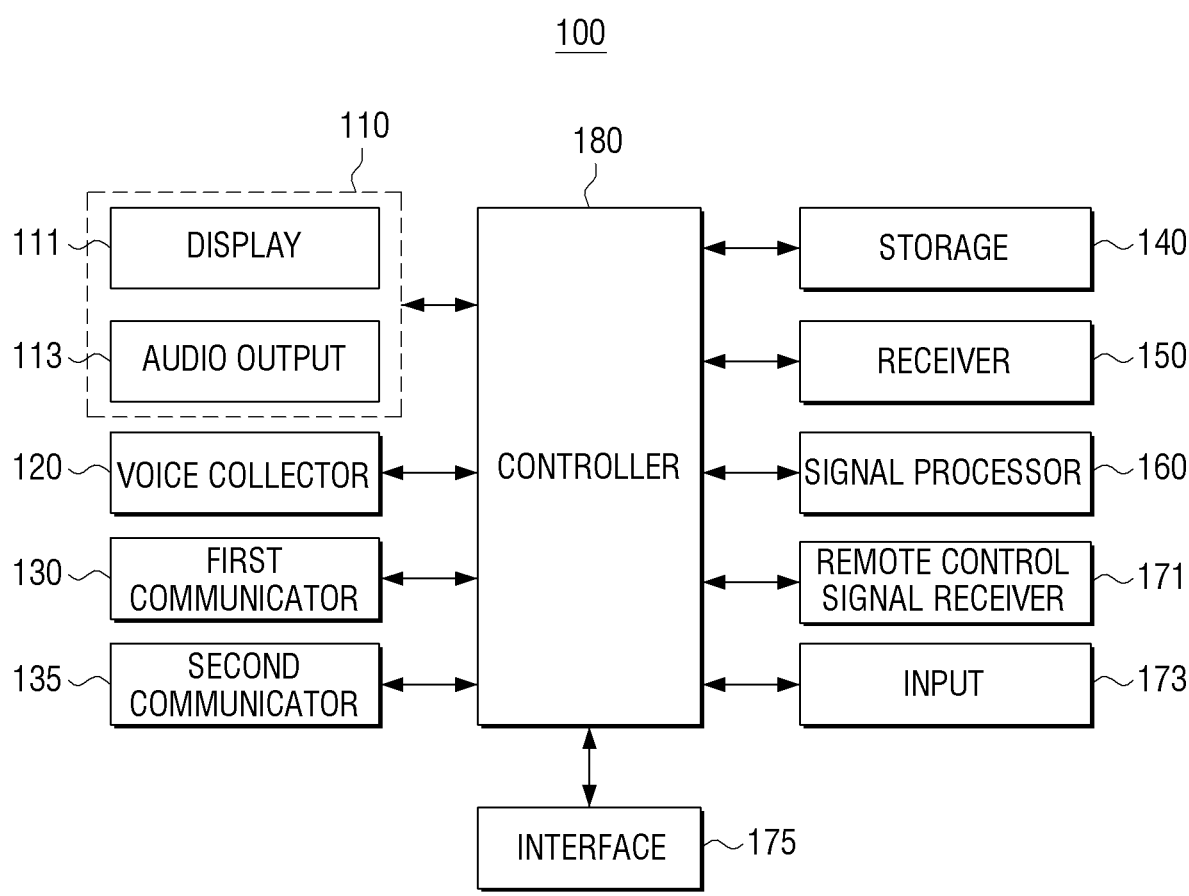
FIG. 2 is a block diagram of a display apparatus according to an exemplary embodiment.

FIG. 2 is a block diagram of a display apparatus according to an exemplary embodiment. Referring to FIG. 2, the display apparatus 100 may include an output 110, a voice collector 120, a first communicator 130, a second communicator 135, a storage 140, a receiver 150, a signal processor 160, a remote control signal receiver 171, an input 173, an interface 175 and a controller 180. Accordingly, the above-noted elements of the display apparatus may take the form of an entirely hardware embodiment such as a processor or circuit(s), an entirely software embodiment (including firmware, resident software, micro-code, etc.) or an embodiment combining software and hardware.

Although FIG. 2 illustrates various elements that can be included in the display apparatus 100, the display apparatus 100 may not necessarily include all of the elements, and may not be limited to have only the above-mentioned elements. According to the product type of the display apparatus 100, some elements may be deleted or added, or substituted with other elements.

The output 110 outputs at least one of voices and images. Specifically, the output 110 may output system replies corresponding to user voices collected in the voice collector 120 in at least one format of a voice format and a UI screen format.

UI screen may express system replies corresponding to user voices in text format or search results searched by user voices in list format.

The output 110 may include a display 111 and an audio output 113.

Specifically, the display 111 may be implemented as a liquid crystal display (LCD), an organic light emitting display (OLED), or a plasma display panel (PDP), but is not limited thereto.

The display 111 may provide various display screens that can be provided though the display apparatus 100. Specifically, the display 111 may create and display UI screens with system replies corresponding to user voices.

The audio output 113 may be implemented as an output port such as a jack or a speaker, and may output system replies corresponding to user voices in voice format.

Further, the output 110 may output various contents. Herein, contents may include broadcasting contents and VOD contents. For example, the display 111 may output images constituting contents and the audio output 113 may output audios constituting contents.

The voice collector 120 collects user voices. For example, the voice collector 120 may be implemented as a microphone to collect user voices, and may be mounted within the display apparatus 100 to constitute an integrated type microphone, or may be implemented to be separated from the display apparatus 100. When the voice collector 120 is implemented as a separate type, the voice collector 120 may be implemented as a grip type that a user can hold, or a set type that can be placed on a dining-room table or a living-room table. The microphone may be connected with the display apparatus 100 through a wired or a wireless network, and may transmit collected user voices to the display apparatus 100.

The voice collector 120 may determine whether the collected voices are user voices, and perform filtering on the collected voices to remove background noises such as air conditioner sounds, vacuum cleaner sounds or music sounds from the collected user voices.

For example, the voice collector 120 performs sampling on the user voices, and converts the received signals into digital signals when user voices in analog format are inputted. The voice collector 120 calculates the energy of the converted digital signals and determines whether the energy of the digital signals is more than a preset value.

If the energy of the digital signals is more than a preset value, the voice collector 120 removes noise elements from the digital signals and transmits the filtered signal to the first communicator 130. At this process, noise elements are sporadic irrelevant sounds that can occur within the home environment, and may include noises such as air conditioner sounds, vacuum cleaner sounds and music sounds. When the energy of the digital signals is less than a preset value, the voice collector 120 waits for another user voice input without processing the digital signals.

Accordingly, unnecessary electric consumption can be prevented because whole audio processing is not activated when background noises are not included with the user voices.

The first communicator 130 performs communication with the first server 200 of FIG. 1. Specifically, the first communicator 130 transmits user voices to the first server 200 and receives text information corresponding to user voices from the first server 200.

The second communicator 135 performs communication with the second server 300 of FIG. 1. Specifically, the second communicator 135 may transmit received text information to the second server 300, and receive reply data corresponding to the text information from the second server 300.

The first communicator 130 and the second communicator 135 may perform communication with the first server 200 and the second server 300 by using various communication methods.

For example, the first communicator 130 and the second communicator 135 may perform communication with the first server 200 and the second server 300 by using wire/wireless local area network (LAN), wide area network (WAN), Ethernet, Bluetooth, Zigbee, universal serial bus (USB), IEEE 1394, and Wifi. Thus, the first communicator 130 and the second communicator 135 may include chips or input ports corresponding to each communication method. For example, when performing communication with a wired LAN method, the first communicator 130 and the second communicator 135 may include wired LAN cards (not illustrated) and input ports (not illustrated).

The above exemplary embodiment discloses that the display apparatus 100 may mount separate communicators 130, 135 in order to communicate with the first server 200 and the second server 300. However, this is merely exemplary. The display apparatus 100 may also communicate with the first server 200 and the second server 300 through a single communication module.

Further, the above exemplary embodiment discloses that the first communicator 130 and the second communicator 135 communicate with the first server 200 and the second server 300. However, this is merely exemplary. The first communicator 130 and the second communicator 135 may perform web browsing by connecting with a web server (not illustrated).

The storage 140 is a storage medium in which various programs necessary for operating the display apparatus 100 are stored, and may be implemented as a non-transitory computer recording medium such as a compact disk (CD), a digital versatile disk (DVD, and hard disk drive (HDD). For example, the storage 140 may include a read only memory (ROM) which stores programs to operate the controller 180 and a random access memory (RAM) which temporarily stores data according to operation of the controller 180. Further, the storage 140 may include electrically erasable and programmable ROM (EEPROM) which stores various relevant data.

The receiver 150 receives various contents. Herein, contents may include broadcasting contents and VOD contents, but is not limited thereto.

Specifically, the receiver 150 may receive contents from broadcasting stations which transmit broadcasting programs by using a broadcasting network or web servers which transmit content files by using the Internet.

If contents are received from broadcasting stations, the receiver 150 may be implemented as a system which includes a tuner (not illustrated), a demodulator (not illustrated), and a lighter (not illustrated). When contents are received from sources such as web servers, the receiver 150 may be implemented as a network interface card (not illustrated).

Thus, the receiver 150 may be implemented as various types of receivers according to the exemplary embodiments.

The signal processor 160 may perform signal processing on the contents so that contents received through the receiver 150 or the interface 175 can be outputted by the output 110.

Specifically, the signal processor 160 may perform operations such as decoding, scaling and frame rate converting on the images included in the contents, and may convert the contents to a format that can be outputted in the display 111. Further, the signal processor 160 may perform signal processing such as decoding on the audio signals included in the contents and convert the audio signals to a format that can be outputted in the audio output 113.

The remote control signal receiver 171 receives remote control signals from external remote controllers. The controller 180 may perform various operations based on the remote control signals received in the remote control signal receiver 171. For example, the controller 180 may perform functions such as power on/off, channel change and volume control according to controlling signals received through the remote control signal receiver 171.

The input 173 receives various user commands. The controller 180 may perform operations corresponding to user commands inputted in the input 173. For example, the controller 180 may perform power on/off, channel change and volume control according to user commands inputted from the input 173.

The input 173 may be implemented as an input panel. The input panel may be configured as a touch pad, a key pad which arranges various function keys, number keys, special keys and character keys, or a touch screen.

The interface 175 communicates with external devices (not illustrated). External devices (not illustrated) may be implemented as various types of electronic devices, and transmit contents to the display apparatus 100. For example, when the display apparatus 100 is implemented as a TV, external devices (not illustrated) may be implemented as various types of electronic devices that can connect to the display apparatus 100 and perform functions such as cellular phone, set-top box, DVD player, Blu-ray disk player and gaming machines.

For example, the interface 175 may communicate with external devices (not illustrated) according to various wired communication methods such as HDMI and USB or wireless communication methods such as Bluetooth and Zigbee. The interface 175 may include chips or input ports corresponding to each communication method. For example, when communicating with external devices (not illustrated) according to the HDMI communication method, the interface 175 may include HDMI ports.

The controller 180 controls general operations of the display apparatus 100. The controller 180 may control operations of the output 110, the voice collector 120, the first communicator 130, the second communicator 135, the storage 140, the signal processor 160, the remote control signal receiver 171, the input 173, and the interface 175. The controller 180 may further include ROM and RAM which store programs and data to control the central processing unit (CPU) and the display apparatus 100.

Specifically, the controller 180 may control the first communicator 130 to collect user voices input through the voice collector 120, to transmit the collected user voices to the first server 200, and receive text information from the first server 200. The controller 180 may control the second communicator 135 to transmit the received text information to the second server 300 when text information corresponding to user voices is received.

When reply data corresponding to user voices is received from the second server 300, the controller 180 may perform various operations based on the received reply data.

Specifically, the controller 180 may perform functions corresponding to user voices based on the received reply data.

Reply data may include controlling commands to control the display apparatus 100. Herein, controlling commands may include commands to perform functions corresponding to user voices among functions that can be operated in the display apparatus 100. Therefore, the controller 180 may control each element of the display apparatus 100 so that functions corresponding to user voices can be operated based on the received controlling commands from the second server 300.

For example, when the display apparatus 100 is implemented as a TV, and the display apparatus collects a user voice saying, "to channel # (#: channel number)," the second server 300 may determine that the intention of the utterance included in the user voice "to channel # (#: channel number)", to be a request to change channels to channel # (#: channel number), and transmit controlling commands to change channels to channel # (#: channel number) to the display apparatus 100. Therefore, the controller 180 may control so that channel # (#: channel number) is tuned based on the received controlling commands and the contents provided through the selected channel is outputted.

However, this is merely exemplary the controller 180 may control each element of the display apparatus 100 so that diverse operations such as power on/off or volume control can be performed according to collected user voices.

Further, reply data may include diverse information related with system replies which are outputted in the display apparatus 100. In this case, reply data may further include controlling commands to output system replies corresponding user voices.

Specifically, when the utterance of the user voices have the intent to search contents are collected in the display apparatus 100, the second server 300 may determine the intent of the user utterance, and search contents matching the determined intention of the utterance. The second server 300 may transmit at least one of information regarding searched contents such as title, cast, producer, genre, broadcasting type, broadcasting time, screen quality, viewing rate, broadcasting channel and thumbnail.

In this case, the controller 180 may output system replies corresponding to user voices in at least one of a voice format and a UI screen format by using received information. According to the above exemplary embodiment, the controller 180 may generate a list of contents by using information regarding contents received from the second server 300 and output a UI screen including the generated list. The controller 180 may add at least one of information regarding the searched contents such as title, cast, producer, genre, broadcasting type, broadcasting time, screen quality, viewing rate, broadcasting channel and thumbnail to the list.

The reply data may include system reply data which expresses system replies outputted on the display apparatus 100 in text format. Therefore, the controller 180 may control the output 110 to output system replies corresponding to user voices in at least one format of a voice format and a UI screen format by using received reply data.

For example, the controller 180 may convert system reply data expressed in text format to voices by using a text to speech (TTS) engine, and output the voice utterance through the audio output 113. The TTS engine is a module which converts texts to voices. The TTS engine may convert texts to voices by using various TTS algorithms disclosed in the related art. Further, the controller 180 may create a UI screen which includes texts constituting system reply data, and output the texts through the display 111.

The controller 180 may analyze user preference information and store the user preference information in the storage 140. Specifically, when a command to power on or change channels is inputted, the controller 180 may determine contents provided from the selected channel based on EPG information, and store at least one of information regarding the determined contents such as title, cast, producer, genre, broadcasting type, broadcasting time, screen quality, viewing rate and broadcasting channel. Further, when a command to power on or change input ports is inputted, the controller 180 may determine that contents provided from external devices (not illustrated) connected to the interface 175, and store at least one of information regarding the determined contents such as title, cast, producer, genre, broadcasting type, broadcasting time, screen quality, viewing rate and broadcasting channel. The controller 180 may request transmission information regarding contents stored in the external devices (not illustrated).

The controller 180 may determine the title, cast, producer, genre, broadcasting type, broadcasting time, screen quality, viewing rate, and broadcasting channel with regard to contents which are viewed more than a preset number of times to be the title, cast, producer, genre, broadcasting type, broadcasting time, screen quality, viewing rate and broadcasting channel which a user prefers, and store that information in the storage 140. When a command to request user preference information is received from the second server 300, the controller 180 may transmit user preference information to the second server 300.

However, the above is merely exemplary. The controller 180 may display a UI screen which receives user preference information according to preset events, and store the user preference information inputted through the UI screen in the storage 140.

The controller 180 may transmit information regarding a channel which a user is currently viewing to the second server 300. For example, when a requesting command is received from the second server 300, the controller 180 may determine the currently selected channel through the receiver 150 and transmit information regarding the determined channel to the second server 300.

Figure 3:
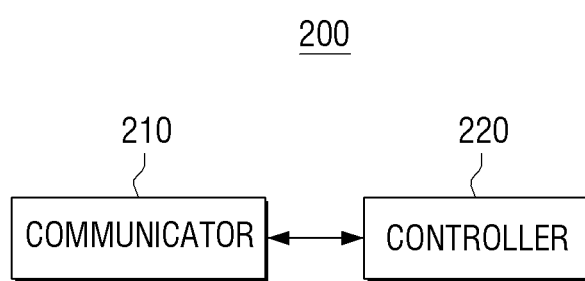
FIG. 3 is a block diagram of a first server according to an exemplary embodiment.

FIG. 3 is a block diagram of the first server according to an exemplary embodiment. Referring to FIG. 3, the first server 200 includes a communicator 210 and a controller 220.

The communicator 210 performs communication with the display apparatus 100. Specifically, the communicator 210 may receive user voices from the display apparatus 100 and transmit text information corresponding to the received user voices to the display apparatus 100. The communicator 210 may include diverse communication modules.

The controller 220 controls general operations of the first server 200. Specifically, when user voices are received from the display apparatus 100, the controller 220 controls the communicator 210 to generate text information corresponding to the received user voices, and transmit the text information to the display apparatus 100.

Specifically, the controller 220 may generate text information corresponding to the received user voices by using a speech to text (STT) engine. Herein, the STT engine is a module which converts voice signals to texts. The SST engine may convert voice signals to texts by using various STT algorithms disclosed in the related art.

For example, the controller 220 determines voice intervals by examining the start and end of voices which a user utters within the received user voices. Specifically, the controller 220 may calculate the energy of the received voice signals, classify the energy level of the voice signals according to the calculated energy, and examine the voice interval through dynamic programming. Further, the controller 220 may generate phoneme data by examining the phoneme as minimum unit of voices based on an acoustic model within the examined voice interval, and convert user voices to texts by applying a Hidden Markov Model (HMM) probabilistic model to the generated phoneme data.

Figure 4:
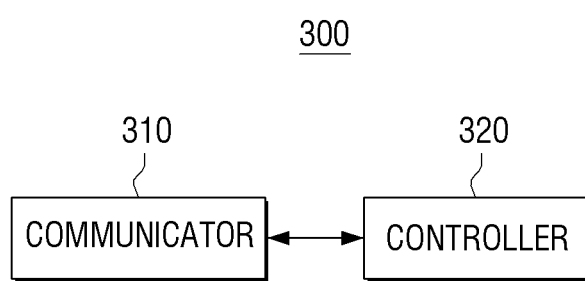
FIG. 4 is a block diagram of a second server according to an exemplary embodiment.

FIG. 4 is a block diagram of the second server according to an exemplary embodiment. Referring to FIG. 4, the second server 300 includes a communicator 310 and a controller 320.

The communicator 310 performs communication with the display apparatus 100. Specifically, the communicator 310 may receive text information corresponding to user voices collected in the display apparatus 100 from the display apparatus 100. The communicator 310 may transmit reply data corresponding to the received text information to the display apparatus 100.

Further, the communicator 310 performs communication with the external server 400 of FIG. 1. Specifically, the communicator 310 may transmit a query to search contents to the external server 400, and receive the search results according to the query from the external server 400.

The communicator 310 may include various communication modules. For example, the communicator 310 may perform communication with the display apparatus 100 and the external server 400 through communication methods such as wire/wireless LAN, Ethernet, Bluetooth, Zigbee, USB, IEEE 1394, and Wifi, but not limited thereto. The communicator 310 may mount chips or input ports corresponding to each communication method. For example, when performing communication with wired LAN method, the communicator 310 may arrange wired LAN cards (not illustrated) and input ports (not illustrated).

However, this is merely exemplary. The communicator 310 may also install other separate communication modules to perform communication with each of the display apparatus 100 and the external server 400.

The controller 320 controls general operations of the second server 300. Specifically, the controller 320 may extract utterance components from text information, generate query to search contents by using the extracted utterance components, and transmit the query to the external server 400. The external server 400 may divide and store metadata regarding contents per item.

Specifically, when text information is received from the display apparatus 100, the controller 320 may extract utterance components from the text information and determine the intention of the user's utterance by using the extracted utterance components.

For example, it is assumed that text information such as "Find re-airing programs" is received from the display apparatus 100. In this case, the controller 320 may extract the term, "re-airing programs," as the utterance component related with a broadcasting type from the text information written as "Find re-airing programs" by using prestored keywords. The controller 320 may determine that the term, "Find," corresponds to a search request using prestored keywords, and determine that the intention of the utterance "Find re-airing programs" corresponds to a search request for re-airing programs.

If the intention of the user utterance relates to searching contents, the controller 320 may generate a query to search contents by using the extracted intention of the utterance. The controller 320 determines items which are mapped with the extracted utterance components and criteria which divide contents per item in structured metadata stored in the external server 400.

Based on criteria to categorize the contents under an item mapped with the extracted intention of the utterance, the controller 320 determines the attributes effectiveness of searching the features in the extracted utterance components. Specifically, according to whether the number of criteria to categorize the contents under an item mapped with the extracted utterance components is a preset number or not, i.e., when the number of criteria to categorize contents is less than the preset number, the controller 320 may determine the extracted utterance components to be an un-matched searching condition. The preset number may be two. However, the preset number may not be limited to two.

If the extracted utterance components are determined to be an un-matched searching condition, the controller 320 may generate a query by adding at least one of semantically orthogonal attributes from the extracted utterance components as criteria to search contents. Herein, semantically orthogonal attributes are attributes which do not affect the intention of the user utterance for searching contents and may be already established.

Specifically, the controller 320 may generate a query by adding preset items as criteria to search contents, when the number of criteria to categorize contents under an item corresponding to the extracted utterance components is less than the preset number.

Herein, items whose criteria to categorize contents are less than the preset number may be at least one of broadcasting type item and screen quality item. Further, preset items may be at least one of broadcasting time item and broadcasting channel item.

In the following, it is assumed that the external server 400 structures and stores metadata as illustrated in FIG. 5 for further specific explanation.

First, the external server 400 may divide metadata of contents per item. Items are various contents information included in metadata, and the external server 400 may divide and store metadata into items such as title, cast, producer, genre, broadcasting type, broadcasting time, screen quality, viewing rate, and broadcasting channel, as shown in FIG. 5.

The external server 400 may structure and store metadata of contents according to criteria to categorize the contents under each item.

For example, referring to FIG. 5, the external server 400 may divide metadata of contents into title item 510 which categorizes the metadata regarding contents by applying "title" as criteria to categorize contents, cast item 520 which categorizes the metadata regarding the contents by applying "cast" as criteria to categorize contents, producer item 530 which categorizes the metadata regarding contents by applying "producer" as criteria to categorize contents, genre item 540 which categorizes the metadata regarding the contents by applying "genre" as criteria to categorize the contents, broadcasting type item 550 which categorizes the metadata regarding the contents by applying "broadcasting type" as criteria to categorize contents, broadcasting time item 560 which categorizes the metadata regarding contents by applying "broadcasting time" as criteria to categorize the contents, screen quality item 570 which categorizes the metadata regarding contents by applying "screen quality" as criteria to categorize contents, viewing rate item 580 which categorizes the metadata regarding contents by applying "viewing rate" as criteria to categorize the contents, and broadcasting channel item 590 which categorizes the metadata regarding contents by applying "broadcasting channel" as criteria to categorize contents. After dividing, the external server 400 may structure and store the metadata of contents.

However, this is merely exemplary. The external server 400 may also structure and store metadata by using various other contents information constituting the metadata.

When the external server 400 structures and stores the metadata illustrated in FIG. 5, a method for generating query to search the contents in the controller 320 will be explained below.

For example, when text information written as "Find re-airing programs" is received from the display apparatus 100, the controller 320 may extract the utterance components, "re-airing programs," from "Find re-airing programs."

In this case, "re-airing programs" is an utterance component which is related to the item "broadcasting type", and an item mapped with the utterance components in the structured metadata corresponds to the broadcasting type item 550. Therefore, the controller 320 checks the number of criteria to categorize contents under the broadcasting type item 550 in the structured metadata.

Because the broadcasting type item 550 is divided into two criteria to categorize contents, i.e., first airing and re-airing, the controller 320 may determine that the number of criteria to categorize contents under an item mapped with the extracted utterance component is less than a preset number, and that the extracted utterance components are un-matched searching conditions.

The reason why the extracted utterance components are determined to be un-matched searching conditions when the number of criteria to categorize the contents under an item mapped with the extracted utterance components is less than the preset number is that efficiency of searching contents becomes lower when too many contents are to be searched when contents are searched only with the extracted utterance components.

Therefore, the controller 320 may generate a query for searching contents by adding preset items as criteria to search contents. Specifically, the controller 320 may establish searching conditions under the preset items and generate a query for searching contents by using the established searching conditions and the extracted utterance components.

Herein, preset items may be at least one of the broadcasting time item and the broadcasting channel item.

Conditions established per preset item may be previously established in each item. For example, regarding the broadcasting time item, conditions may be preset as contents which are aired within a preset time, e.g., 24 hours, from the current time. Regarding the broadcasting channel item, conditions may be preset as contents which are aired on a channel that a user is currently viewing.

Therefore, when the broadcasting time item is added as criteria to search contents, the controller 320 may establish contents which are aired within the preset time from the current time as conditions regarding the broadcasting time item. The controller 320 may generate a query for searching contents of which broadcasting time is 24 hours from the current time and broadcasting type is re-airing, and transmit the generated query to the external server 400.

The external server 400 may perform the searching of contents based on the query received from the second server 300, and transmit the search results to the second server 300. The external server 400 may transmit information regarding the searched contents such as at least one of title, thumbnail, cast, producer, genre, broadcasting type, broadcasting time, screen quality, viewing rate, and broadcasting channel as search results. For example, when it is 10 o'clock, 7th of January, the external server 400 may transmit title information regarding the searched contents, i.e., Title_BBB, Title_CCC by using the structured metadata in FIG. 5.

When the broadcasting channel item is added as a criteria to search the contents, the controller 320 may establish information regarding a channel that a user is currently viewing as conditions regarding the broadcasting channel item. The controller 320 may request information regarding the currently selected channel in the display apparatus 100 and receive information regarding the channel that a user is currently viewing. Therefore, when the display apparatus 100 currently selects CH 22, the controller 320 may generate a query to search contents of which the broadcasting channel is CH 22 and broadcasting type is re-airing, and transmit the generated query to the external server 400.

The external server 400 may perform searching of the contents by using the query received from the second server 300 and transmit the search results to the second server 300. The external server 400 may transmit information regarding the searched contents such as at least one of title, thumbnail, cast, producer, genre, broadcasting type, broadcasting time, screen quality, viewing rate and broadcasting channel as search results. For example, the external server 400 may transmit title information of the searched contents, i.e., Title_III by using the structured metadata in FIG. 5.

As described above, the reason why the broadcasting channel item or the broadcasting time item is added as additional conditions to search the contents is that the intention of the user utterance to search the contents may not be affected. Thus, since the intention of the user utterance in the above exemplary embodiments is to simply request a search for re-airing programs, the intention of the user utterance may be affected when items such as title, cast, producer and genre are established as additional conditions. Therefore, the broadcasting channel item or the broadcasting time item which has a lower possibility of affecting the intention of the user utterance may be added.

The controller 320 may generate reply data by using the search results received from the external server 400, and transmit the generated reply data to the display apparatus 100.

Reply data may include diverse information related to system replies outputted in the display apparatus 100. In this case, reply data may further include controlling commands to output system replies corresponding to user voices.

According to the above exemplary embodiment, when the display apparatus 100 collects "Find re-airing programs," the controller 320 may transmit information of the received contents such as at least one of title, thumbnail, cast, producer, genre, broadcasting type, broadcasting time, screen quality, viewing rate and broadcasting channel to the display apparatus 100. In this case, the controller 320 may transmit a controlling command to output a contents list to the display apparatus 100 by using the contents information.

Therefore, the display apparatus 100 may output system replies corresponding to user voices based on the reply data received from the second server 300. In other words, the display apparatus 100 may output a UI screen constituting a list of the searched contents in response to a user voice request for searching contents. The display apparatus 100 may add information of the searched contents such as at least one of title, thumbnail, cast, producer, genre, broadcasting type, broadcasting time, screen quality, viewing rate and broadcasting channel to the list.

According to the above exemplary embodiment, the display apparatus 100 may output a list constituting contents BBB and contents CCC or a list constituting searched contents in response to user voices saying, "Find re-airing programs."

Therefore, according to an exemplary embodiment, when the extracted intention of the utterance is an un-matched searching conditions, contents may be searched by automatically adding criteria to search the contents.

Although the above exemplary embodiment discloses that an item mapped with the extracted utterance components is the broadcasting type item, this is merely exemplary. The screen quality item 570 is divided into HD and SD, i.e., two criteria to categorize the contents, when utterance components related to screen quality are extracted, the extracted utterance components may be determined to be un-matched searching conditions.

Further, although the above exemplary embodiment discloses that one preset item is added as a criteria to search the contents, this is merely exemplary. The controller 320 may add a plurality of preset items as criteria to search contents. Specifically, the controller 320 may establish conditions in each of the broadcasting time item and the broadcasting channel item, and generate a query to search contents by using the plurality of established conditions and the extracted utterance components.

Further, although the above exemplary embodiment discloses that preset items are added as a criteria to search the contents, this is merely exemplary. The controller 320 may determine preset items to be added as a criteria to search the contents based on user preference information. Herein, user preference information may include at least one of title, cast, producer, genre, broadcasting type, broadcasting time, screen quality, viewing rate and broadcasting channel which a user prefers. In this case, user preference information may be received from the display apparatus 100.

For example, it is assumed that genre preferred by a user is movie. The controller 320 may determine the genre item to be added as a criteria to search contents and generate a query to search contents by using the determined criteria to search contents. According to the above exemplary embodiment, the controller 320 may establish "movie" as conditions regarding the genre item, generate a query to search the contents of which the genre is movie and broadcasting type is re-airing, and transmit the generated query to the external server 400. Accordingly, the external server 400 may transmit title information of the searched contents, Title_HHH by using the structured metadata of FIG. 5.

Further, although the above exemplary embodiment discloses that, when the extracted utterance components are un-matched searching conditions, contents may be searched by automatically adding other criteria to the search contents, this is merely exemplary. The controller 320 may ask a user whether to add other criteria to the search contents and determine that other criteria to search the contents are added based on user replies.

Specifically, when the extracted utterance components are un-matched searching conditions, the controller 320 may generate and transmit reply data to the display apparatus 100 so that the display apparatus 100 can output a question asking the user whether to add criteria to search the contents as system replies.

The controller 320 may express system replies outputted in the display apparatus 100 in text format and transmit the replies to the display apparatus 100. For example, the controller 320 may express "Your command is simple and may have many results. Broadcasting time is additionally limited. Add and search?" in text format and transmit the text to the display apparatus 100.

Therefore, the display apparatus 100 may output a question asking whether to additionally add criteria to search contents based on the received reply data from the second server 300 as system replies. For example, the display apparatus 100 may output UI screen including the text, "Your command is simple and may have many results. Broadcasting time is additionally limited. Add and search?"

The controller 320 may perform the searching of the contents by adding criteria to search the contents based on the received text information. For example, when text information of "Yes" is received from the display apparatus, the controller 320 may determine that the term, "Yes," corresponds to a positive response based on prestored keywords, and may perform the searching of contents by adding the preset item as a new criteria to search contents. When text information of "No" is received, the controller 320 may determine that the term, "No," corresponds to a negative response based on prestored keywords, and perform the searching of the contents by using the extracted utterance components only without adding new criteria to search the contents.

Further, although the above exemplary embodiment discloses that other criteria to search the contents are automatically added when the extracted utterance components are un-matched searching conditions, this is merely exemplary. When the contents that are searched according to the extracted utterance components do not provide any results, the controller 320 may perform searching contents of the contents by using other parts of the extracted utterance components.

For example, it is assumed that text information of "Find re-airing programs at CH 7 which all ages can watch" is received from the display apparatus 100. The controller 320 extracts the term, "CH 7," as utterance components related with the broadcasting channel, extracts the term, "all ages" as utterance components related with the viewing rate, and extracts the term, "re-airing programs," as utterance components related with the broadcasting type from the text information of "Find re-airing programs at CH 7 which all ages can watch." Therefore, the controller 320 may determine that the intention of the utterance of "Find re-airing programs at CH 7 which all ages can watch" is to request the search for re-airing programs on CH 7 that all ages can watch.

In this case, the controller 320 may generate a query to search contents by using the extracted utterance components. According to the above exemplary embodiment, the controller 320 may generate a query to search the contents of which the broadcasting channel is CH 7, the viewing rate is all ages, and the broadcasting type is re-airing, and transmit the generated query to the external server 400.

However, when the external server 400 arranges the structured metadata of FIG. 5, because there are no contents satisfying the query received from the second server 300, the external server 400 may transmit a reply to the second server 300 indicating that there are no search results.

The controller 320 may regenerate a query to search the contents by using other parts of the extracted utterance components. Specifically, the controller 320 may remove the extracted utterance components corresponding to at least one of the broadcasting time type and the broadcasting channel type, and regenerate a query to search the contents by using the other parts of the utterance components. According to the above exemplary embodiment, the controller 320 may remove the utterance components corresponding to at least one of the broadcasting channel, the viewing rate, and the broadcasting type, and regenerate a query to search the contents by using the other parts of the utterance components. In other words, the controller 320 may generate a query to search the contents of which viewing rate is all ages and broadcasting type is re-airing after removing the utterance components regarding the broadcasting channel, or generate a query to search the contents of which the broadcasting channel is CH 7 and the broadcasting type is re-airing after removing the utterance components regarding the viewing rate, or generate a query to search the contents of which the broadcasting channel is CH 7 and the viewing rate is all ages after removing the utterance components regarding the broadcasting type.

When searching of the contents is not performed with the query generated by adding preset items as criteria to search contents, the controller 320 may regenerate the query to search the contents by using the extracted utterance components. When there are no contents which satisfy the extracted utterance components, and all of the searching conditions have been added as criteria to search contents, the controller 320 may regenerate the query to search the contents by using only the extracted utterance components.

According to the above exemplary embodiment, it is assumed that a channel which a user is currently viewing is CH 2. In this case, the controller 320 may generate a query to search the contents of which the broadcasting channel is CH 2 and the broadcasting type is re-airing, and transmit the generated query to the external server 400.

However, when the external server 400 arranges the structured metadata of FIG. 5, the external server 400 may transmit replies saying that there are no search results to the second server 300 because there are no contents which satisfy the received query from the second server 300. In this case, the controller 320 may regenerate a query to search the contents by using the extracted utterance components only. Thus, according to the above exemplary embodiment, the controller 320 may generate a query to search the contents of which broadcasting type is re-airing and transmit the generated query to the external server 400.

Figure 6:
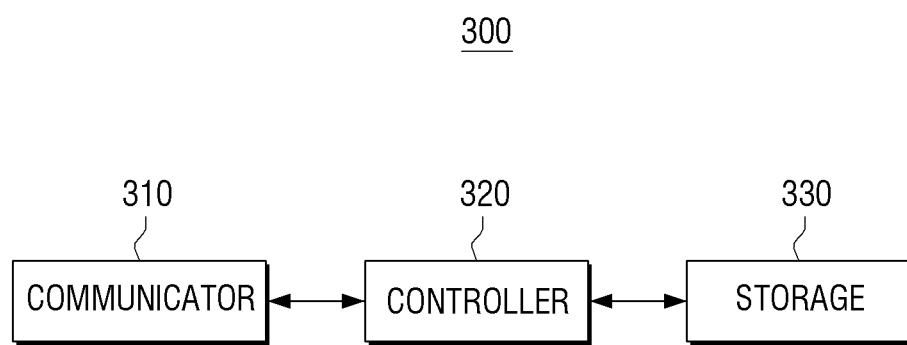
FIG. 6 is a detailed block diagram of the second server in FIG. 4.

FIG. 6 is a detailed block diagram of the second server illustrated in FIG. 4. Referring to FIG. 6, the second server 300 may further include a storage 330 as well as the elements illustrated in FIG. 4. The like elements of FIG. 6 overlapping with those FIG. 4 with the same function will not be explained for the sake of brevity.

The storage 330 may store information regarding criteria to categorize contents under an item. The storage 330 may store each item of the structured metadata stored in the external server 400 and information regarding criteria to categorize the contents which further divide each item. Therefore, the controller 320 may determine whether criteria to categorize the contents under an item corresponding to extracted utterance components are less than a preset number based on information regarding criteria to categorize the contents.

Further, the storage 330 may store diverse information to determine the intention of the user utterance by using received text information from the display apparatus 100.

Specifically, the storage 330 may store various information to analyze domain, user action and slot from user voices by using received text information from the display apparatus 100.

Herein, the domain may be divided by topics which user uttering voices belong to such as "broadcasting" and "device control." User action indicates the intention of the user utterance such as "information output" and "device control," and slot indicates information which specifies object information regarding the domain, i.e., the intention of the user utterance applied within the domain.

Specifically, the storage 330 may analyze user action within the domain and store keywords to extract the slot.

For example, the storage 330 may store information which keywords such as "limit," "search," "find," and "show" within the domain correspond to a user action which requests information searching. The storage 330 may store various keywords related with contents such as title, cast, producer, genre, broadcasting type, broadcasting time, screen quality, viewing rate and broadcasting channel regarding contents, and store information with regard to the slot that each keyword corresponds to. According to an exemplary embodiment, the storage 330 may store information where the term, "re-airing program," is a keyword related to the a broadcasting type which corresponds to a slot.

According to another exemplary embodiment, the storage 330 may store information where keywords such as "turn on," "high," "low," "turn off," and "execute" within the device control domain correspond to a user action to request device control. The storage 330 may store various keywords related with device control such as channel name, channel number, volume, and power and store information where each keyword corresponds to a slot.

According to another exemplary embodiment, the storage 330 may store information where the terms, "Yes" and "Okay," correspond to keywords which have a positive meaning, and the terms, "No" and "Don't," correspond to keywords which have a negative meaning.

Further, the storage 330 may arrange a corpus database. Herein, a corpus database may be implemented in a format which stores exemplary phrases and replies thereof.

Thus, the storage 330 may store a plurality of exemplary phrases and replies to phrases per purpose domain. In this case, the storage 330 may tag and store information to analyze exemplary phrases and replies corresponding to the exemplary phrases per exemplary phrase.

For example, the storage 330 may store an exemplary phrase, "Find re-airing programs," in a broadcasting domain. In this case, the storage 330 may tag and store information to analyze the exemplary phrase, "Find re-airing programs," with a corresponding phrase. Specifically, the storage 330 may tag and store a corresponding phrase with information where "re-airing programs" indicates a slot related to a broadcasting type and "Find" indicates a slot related to a request searching contents from the exemplary phrase, "Find re-airing programs."

According to another exemplary embodiment, the storage 330 may store an exemplary phrase, "Turn on CH O," in a device control domain. In this case, the storage 330 may tag and store a corresponding phrase with information to analyze the exemplary phrase "Turn on CH O." Specifically, the storage 330 may tag and store a corresponding phrase with information where "CH O" indicates a slot related to a channel number and "Turn on" indicates a slot related to a request to power on/off the television from the exemplary phrase, "Turn on CH O."

Therefore, the controller 320 may extract utterance components from text information received from the display apparatus 100 by using information stored in the storage 330, and determine the intention of the user utterance by using the extracted utterance components.

For example, it is assumed that the text information "Find re-airing programs" is received from the display apparatus 100. The controller 320 may extract "re-airing programs" as utterance components from the phrase "Find re-airing programs" by considering that the term, "re-airing programs," is a slot related to broadcasting type. The controller 320 may determine that "Find" corresponds to a request to search information in a user action, and that the intention of the utterance "Find re-airing programs" is to request the searching of re-airing programs. The controller 320 may determine that the search terms related to the user voice are un-matched terms, generate a query to search contents by adding new searching conditions, and transmit the generated query to the external server 400. The controller 320 may further transmit reply data to the display apparatus 100 so that the display apparatus 100 can output system replies corresponding to "Find re-airing programs."

For another example, it is assumed that text information of "Turn on CH O" is received from the display apparatus 100. The controller 320 may extract "CH O" as utterance components from "Turn on CH O" by considering that the term, "CH O," is slot related with channel number. The controller 320 may determine that "Turn on" corresponds to changing channels in a user action and that the intention of the utterance "Turn on CH O" is to request the changing of channels to CH O. The controller 320 may transmit a controlling command for the display apparatus 100 to change channels into CH O to the display apparatus 100.

Figure 7:
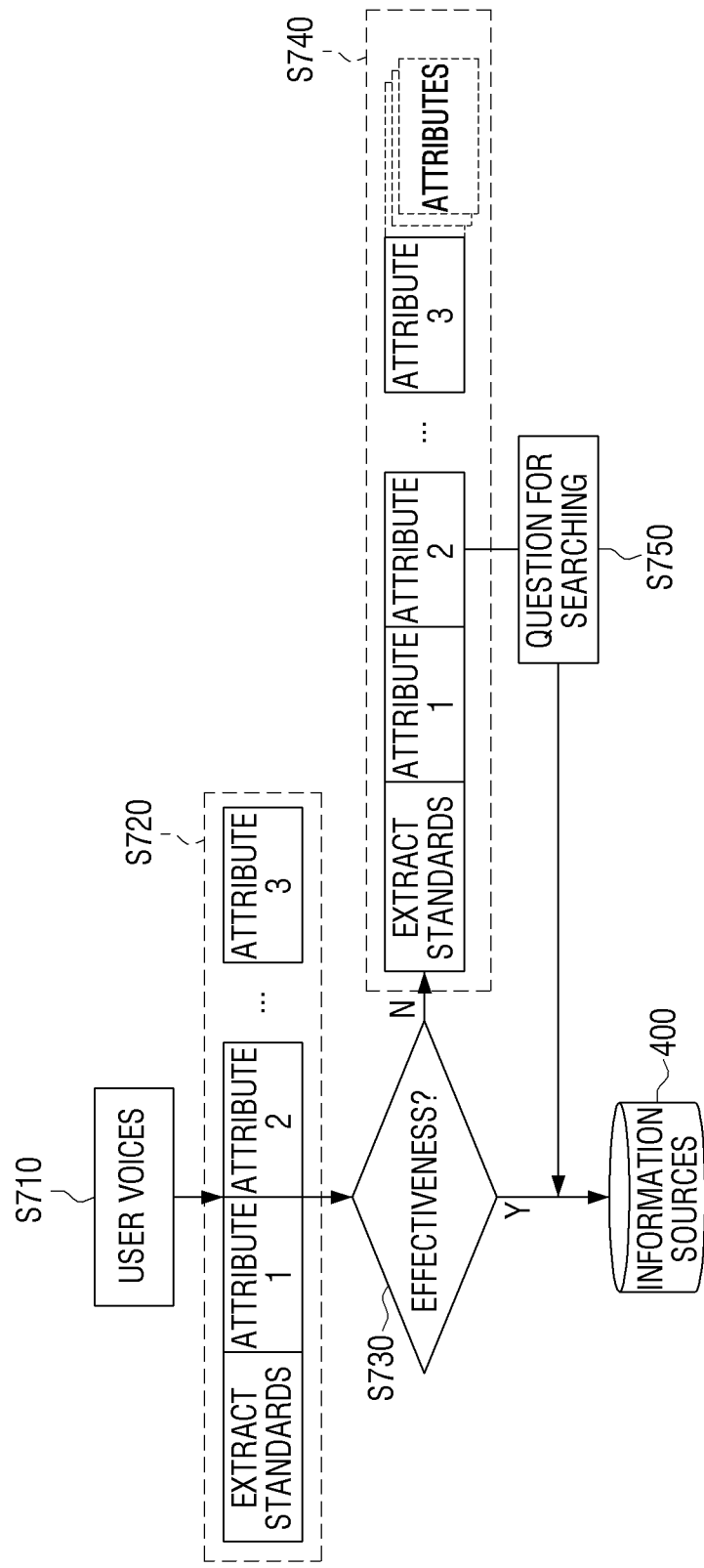
FIG. 7 is a diagram provided to explain an example of a method for adding criteria to search contents according to an exemplary embodiment.

FIG. 7 is a diagram of a method for adding criteria to search contents according to an exemplary embodiment.

Since the method for adding criteria to search contents is described by referring to FIGS. 4 to 6, it will be briefly explained by referring to FIG. 7.

The second server 300 extracts utterance components from user voices at operation S720 when text information corresponding to user voices is received at operation S710. The second server 300 determines attributes effectiveness of the extracted utterance components at operation S730. Specifically, the second server 300 may determine attributes effectiveness of the extracted utterance components based on whether criteria to categorize the contents under an item corresponding to the extracted utterance components are less than the preset number.

Therefore, when the extracted utterance components are determined to be matching searching conditions at operation S730-Y, the second server 300 may generate a query to search the contents by using the extracted utterance components, and transmit the generated query to information sources, i.e., the external server 400.

When the extracted utterance components are determined to be un-matched searching conditions at operation S730-N, the server 300 may determine items to be added as criteria to search contents at operation S740. At this step, the second server 300 may generate a question asking a user whether to add criteria to search contents at operation S750, and provide the generated question to a user through the display apparatus 100. Based on the user's reply to the question, the second server 300 may add criteria to search contents to the extracted utterance components, or generate a query to search contents only with the extracted utterance components, and transmit the generated query to information sources, i.e., the external server 400.

FIGS. 8A, 8B, and 9A-9D illustrate examples of UI screens provided from the display apparatus according to an embodiment.

For example, referring to FIG. 8A, it is assumed that a user utters the phrase "Find re-airing programs."

In this case, the display apparatus 100 may display a UI screen 810 including a list of contents based on reply data received from the second server 300 referring to FIG. 8B. The list of contents may show contents searched for by adding at least one of the broadcasting time and the broadcasting channel as criteria to search contents.

Referring to FIG. 9A, it is assumed that a user utters, "Find re-airing programs."

In this case, if the search condition is improper, the display apparatus 100 may display a UI screen 910 asking whether to add criteria to search contents based on reply data received from the second server 300 referring to FIG. 9B. Referring to FIG. 9C, when a user utters, "Yes," the display apparatus 100 may display UI screen 920 including a list of contents based on reply data received from the second server 300. In this case, the list of contents may show contents searched by adding the broadcasting time as criteria to search contents.

Figure 10:
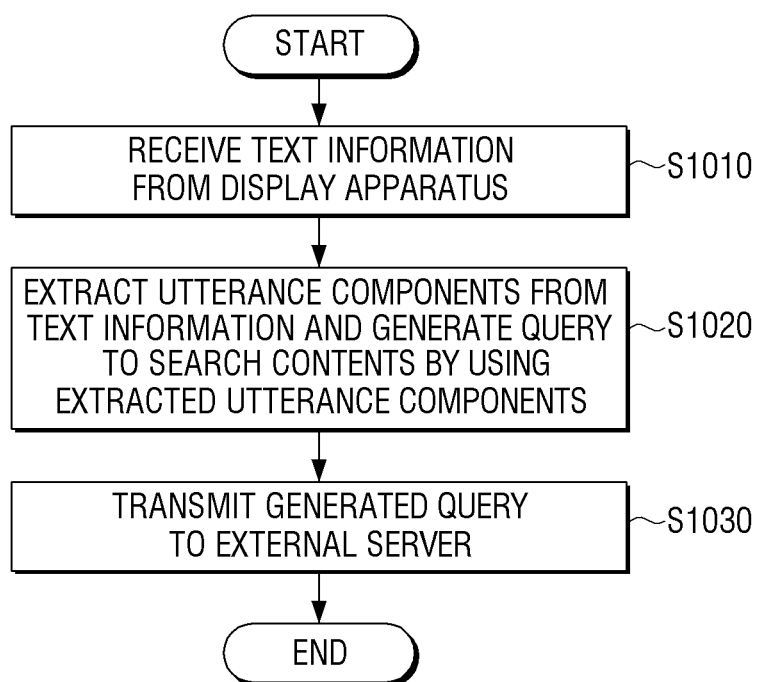
FIG. 10 is a flowchart provided to explain a controlling method of a server according to an exemplary embodiment.

FIG. 10 is a flowchart which illustrates a method for controlling the server according to an exemplary embodiment.

At operation S1010, text information corresponding to user voices collected in the display apparatus is received from the display apparatus.

At operation S1020, utterance components are extracted from the text information and a query to search contents is generated by using the extracted utterance components.

Specifically, when criteria to categorize the contents under an item corresponding to the extracted utterance components are less than a preset number, a query is generated by adding preset items as criteria to search contents.

Herein, items of which criteria to categorize contents are less than the preset number may be at least one of the broadcasting type item and the screen quality item. Further, preset items may be at least one of the broadcasting time item and the broadcasting channel item.

The server may determine whether criteria to categorize contents under an item corresponding to the extracted utterance components based on preset information regarding criteria to categorize contents are less than the preset number.

Further, the server may determine the preset items added as criteria to search contents based on user preference information.

Meanwhile, when searching contents is not performed with query generated by adding preset items as criteria to search contents, query to search contents may be regenerated by using the extracted utterance components.

At S1030, the generated query is transmitted to the external server which categorizes metadata of the content under each item and stores the same.

The method for generating a query by considering preset items or user preference information is described above by referring to FIGS. 1 to 9.

Further, the method may provide non-transitory computer readable medium which store programs implementing the controlling method according to the exemplary embodiment.

Non-transitory readable medium indicate medium which store data semi-permanently and can be read by devices, not medium storing data temporarily such as register, cache, or memory. Specifically, the above various applications or programs may be stored and provided in non-transitory readable medium such as CD, DVD, hard disk, Blu-ray disk, USB, memory card, or ROM.

Further, the above block diagrams illustrating the display apparatus and the server do not describe a bus; however, communication between the elements in the display apparatus and the server may be performed through the bus. Each device may further include processors such as CPU and micro processor which perform the above various steps.

Further, the foregoing exemplary embodiments are merely exemplary and are not to be construed as limiting. The present teaching can be readily applied to other types of apparatuses. Also, the description of the exemplary embodiments is intended to be illustrative, and not to limit the scope of the claims.

What is claimed is:

1. An electronic device comprising:
a receiver;
a communicator; and
a processor configured to:
receive a signal corresponding to a first content via the receiver,
while the first content is displayed on a display, receive a user voice input via a voice receiver,
if the user voice input is a first user voice input which corresponds to a request associated with the displayed first content, receive data corresponding to a first search result which is based on the first user voice input and information regarding the displayed first content, from a server, via the communicator, and process the received data to display the first search result together with the first content,
if the user voice input is a second user voice input which does not correspond to the request associated with the displayed first content, but corresponds to a search for a second content, receive data corresponding to a second search result which is based on the second voice input from the server, via the communicator, and process the received data to display the second search result together with the first content, and
if the user voice input is a third user voice input which corresponds to a control of a function of the electronic device, control the function based on the third user voice input.

2. The electronic device as claimed in claim 1, wherein the signal corresponding to the first content is received using a first communication method and wherein the received data is received using a second communication method different from the first communication method.

3. The electronic device as claimed in claim 1, wherein the processor is further configured to control the display to display the first search result displayed over the displayed first content.

4. The electronic device as claimed in claim 1, wherein the request associated with the displayed first content includes a request for the information regarding the displayed first content.

5. The electronic device as claimed in claim 1, wherein the information regarding the displayed first content includes information regarding a channel in which the displayed first content is provided.

6. The electronic device as claimed in claim 1, wherein the information regarding the displayed first content includes information regarding a title of the displayed first content.

7. The electronic device as claimed in claim 1, wherein the processor is further configured to obtain the information regarding the displayed first content, and transmit the information to the server via the communicator.

8. The electronic device as claimed in claim 1, wherein the control of the function includes at least one of a changing a channel of the electronic device or a changing a volume of the electronic device.

9. The electronic device as claimed in claim 1, wherein the processor is further configured to control the function based on the third user voice input without displaying a content search result which is based on the third user voice input.

10. The electronic device as claimed in claim 1, wherein the first search result is different according to the displayed first content.

11. A method for controlling an electronic device, the method comprising:
receiving a signal corresponding to a first content;
while the first content is displayed on a display, receiving a user voice input;
if the user voice input is a first user voice input which corresponds to a request associated with the displayed first content, receiving data corresponding to a first search result which is based on the first user voice input and information regarding the displayed first content, from a server, and processing the received data to display the first search result together with the first content;
if the user voice input is a second user voice input which does not correspond to the request associated with the displayed first content, but corresponds to a search for a second content, receiving data corresponding to a second search result which is based on the second voice input from the server, and processing the received data to display a screen including the second search result; and
if the user voice input is a third user voice input which corresponds to a control of a function of the electronic device, controlling the function based on the third user voice input.

12. The method as claimed in claim 11, wherein the signal corresponding to the first content is received using a first communication method and wherein the received data is received using a second communication method different from the first communication method.

13. The method as claimed in claim 11, further comprising:

displaying an image that overlaps the received data with the displayed first content on the display.

14. The method as claimed in claim 11, wherein the request associated with the displayed first content includes a request for the information regarding the displayed first content.

15. The method as claimed in claim 11, wherein the information regarding the displayed first content includes information regarding a channel in which the displayed first content is provided.

16. The method as claimed in claim 11, wherein the information regarding the displayed first content includes information regarding a title of the displayed first content.

17. The method as claimed in claim 11, further comprising:

obtaining the information regarding the displayed first content; and transmitting the information to the server.

18. The method as claimed in claim 11, wherein the controlling the function includes at least one of a function for changing a channel of the electronic device or a function for changing a volume of the electronic device.

19. The method as claimed in claim 11, further comprising:

controlling the function based on the third user voice input without displaying a content search result which is based on the third user voice input.

20. The method as claimed in claim 11, wherein the first search result varies according to the displayed first content.

* * * * *